United States Patent
Mukasa (10) Patent No.: US 7,805,040 B2
(45) Date of Patent: Sep. 28, 2010

(54) OPTICAL COMMUNICATION SYSTEM

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/185,841

(22) Filed: Aug. 5, 2008

(65) Prior Publication Data

US 2009/0080844 A1 Mar. 26, 2009

Related U.S. Application Data

(63) Continuation of application No. PCT/JP2008/052815, filed on Feb. 20, 2008.

(30) Foreign Application Priority Data

Feb. 26, 2007 (JP) ............................. 2007-046255

(51) Int. Cl.
*G02B 6/032* (2006.01)
*G02B 6/34* (2006.01)
(52) U.S. Cl. .................... 385/125; 385/37; 385/126; 385/127
(58) Field of Classification Search .................... 385/37, 385/123–128
See application file for complete search history.

(56) References Cited

U.S. PATENT DOCUMENTS 6,826,340 B2 * 11/2004 Bennion et al. ............. 385/123

2001/0021298 A1 * 9/2001 Mukasa ...................... 385/124
2003/0215200 A1 11/2003 Yokokawa et al. .......... 385/123
2008/0219667 A1 9/2008 Imamura

FOREIGN PATENT DOCUMENTS

JP 2003-337242 11/2003

OTHER PUBLICATIONS

"Hollow Core Photonic Bandgap Fiber," BlazePhotonics, http://www.crystal-fibre.com/datasheets/HC-1550-02.pdf, Feb. 16, 2004.
Zhigang Liu et al., Chromatic dispersion and DGD Measurement of Air-Guiding Photonic Band-gap Fibers, SPIE-The International Society for Optical Engineering, vol. 6352, pp. 63520H.1-63520H.6, Dec. 26, 2006.
Bing Yao et al., "Development of the Photonic Band-Gap Fibers," The Institute of Electronics, Information, and Communications Engineers, Mar. 7, 2005 (with English translation).

(Continued)

*Primary Examiner*—Rhonda S Peace
(74) *Attorney, Agent, or Firm*—Oblon, Spivak, McClelland, Maier & Neustadt, L.L.P.

(57) ABSTRACT

A photonic bandgap fiber includes a core formed by a hole at its center, an outer cladding formed around the core, and an inner cladding formed between the core and the outer cladding, in which a two-dimensional Bragg grating is formed by periodically arranging a medium having a different refractive index. An optical fiber is connected to the photonic bandgap fiber, which has wavelength dispersion equal to or larger than 0 ps/nm/km and smaller than wavelength dispersion of the photonic bandgap fiber and D/S value, which is obtained by dividing the wavelength dispersion by dispersion slope, larger than D/S value of the photonic bandgap fiber.

18 Claims, 10 Drawing Sheets

OTHER PUBLICATIONS

Katsuya Nagayama et al., "Ultra Low Loss (0.151 dB/km) Pure Silica Core Fiber and Extension of Transmission Distance," The Institute of Electronics, Information, and Communications Engineers, vol. 102, No. 135, pp. 1-6, Jun. 14, 2002 (with English Abstract).

"Hollow Core Photonic Bandgap Fiber," BlazePhotonics, http://www.crystal-fibre.com/datasheets/HC-1550-01.pdf, May 6, 2004.

Kenji Kurokawa et al., "Penalty-free dispersion-managed soliton transmission over 100 km low loss PCF," Optical Society of America, PDP21, 2005.

* cited by examiner

| WAVE-LENGTH | D | SLOPE | D/S | MFD | Aeff | λc | BENDING LOSS |
|---|---|---|---|---|---|---|---|
| nm | ps/nm/km | ps/nm²/km | nm | μm | μm² | nm | dB/m |
| 1550 | 21.73 | 0.063 | 345 | 11.51 | 115.4 | 1525 | 5.0 |
| 1570 | 22.98 | 0.062 | 373 | 11.56 | 116.2 | | 10.0 |

FIG.6

| WAVE-LENGTH | TRANS-MISSION LOSS | D | SLOPE | D/S | MFD | $\lambda c$ | BENDING LOSS | PMD |
|---|---|---|---|---|---|---|---|---|
| nm | dB/km | ps/nm/km | ps/nm²/km | nm | μm | nm | dB/m | ps/√km |
| 1550 | 0.500 | -170.0 | -0.600 | 283 | 4.5 | 1460 | 0.3 | 0.100 |
| 1570 | 0.500 | -185.0 | -6.00 | 308 | 5.0 | | 1.0 | 0.100 |

FIG.7

|  | D | SLOPE | D/S |
|---|---|---|---|
|  | ps/nm/km | ps/nm²/km | nm |
| OPTICAL TRANSMISSION PATH 1 | 97 | 0.50 | 194 |
| OPTICAL TRANSMISSION PATH 2 | 59.4 | 0.282 | 210 |
| OPTICAL TRANSMISSION PATH 3 | 36.8 | 0.15 | 245 |

FIG.8

|  | CHARACTERISTICS OF OPTICAL TRANSMISSION PATH | | CHARACTERISTICS OF DCF | |
|---|---|---|---|---|
|  | D | SLOPE | LENGTH | TRANSMISSION LOSS |
|  | ps/nm/km | ps/nm²/km | km | dB |
| OPTICAL TRANSMISSION PATH 1 | 0 | 0.158 | 57.06 | 34.2 |
| OPTICAL TRANSMISSION PATH 2 | 0 | 0.072 | 34.94 | 21.0 |
| OPTICAL TRANSMISSION PATH 3 | 0 | 0.020 | 21.65 | 13.0 |

FIG.9

| | D | SLOPE | D/S |
|---|---|---|---|
| | ps/nm/km | ps/nm²/km | nm |
| OPTICAL TRANSMISSION PATH 4 | 50 | 1.5 | 33 |
| OPTICAL TRANSMISSION PATH 5 | 36.5 | 0.781 | 47 |
| OPTICAL TRANSMISSION PATH 6 | 28.4 | 0.35 | 81 |

FIG.10

| | CHARACTERISTICS OF OPTICAL TRANSMISSION PATH | | CHARACTERISTICS OF DCF | |
|---|---|---|---|---|
| | D | SLOPE | LENGTH | TRANSMISSION LOSS |
| | ps/nm/km | ps/nm²/km | km | dB |
| OPTICAL TRANSMISSION PATH 4 | 0 | 1.338 | 27.03 | 13.5 |
| OPTICAL TRANSMISSION PATH 5 | 0 | 0.663 | 19.73 | 9.9 |
| OPTICAL TRANSMISSION PATH 6 | 0 | 0.258 | 15.35 | 7.7 |

FIG.11

|  | LENGTH | TRANS-MISSION LOSS |
|---|---|---|
|  | km | dB |
| OPTICAL TRANSMISSION PATH 1 | 38.8 | 23.3 |
| OPTICAL TRANSMISSION PATH 2 | 23.8 | 14.3 |
| OPTICAL TRANSMISSION PATH 3 | 14.7 | 8.8 |
| OPTICAL TRANSMISSION PATH 4 | 20.0 | 12 |
| OPTICAL TRANSMISSION PATH 5 | 14.6 | 8.8 |
| OPTICAL TRANSMISSION PATH 6 | 11.4 | 6.8 |

FIG.12

OPTICAL COMMUNICATION SYSTEM

CROSS-REFERENCE TO RELATED APPLICATIONS

This application is a continuation of PCT/JP2008/052815 filed on Feb. 20, 2008, the entire content of which are incorporated herein by reference.

BACKGROUND OF THE INVENTION

1. Field of the Invention

The present invention relates to an optical communication system in which an optical fiber is used as an optical transmission path.

2. Description of the Related Art

The use of a photonic bandgap fiber (PBGF) as a representative non-communication fiber for transmitting high power light is being extensively studied. In a photonic bandgap fiber, a two-dimensional (2D) Bragg grating is constructed in a cladding region by periodically arranging a medium such as air that has a refractive index different from that of the cladding region. The photonic bandgap fiber transmits a particular operation wavelength from a gap formed by the 2D Bragg grating with respect to a core region that is formed by a hole in the cladding region. A commercial-based photonic bandgap fiber is disclosed in CRYSTAL FIBRE A/S, "AIRGUIDING HOLLOW-CORE REGION PHOTONIC BANDGAP FIBERS SELECTED DATASHEETS HC-1550-02, HC19-1550-01", [online], [searched on Feb. 8, 2007], Internet (URL: http://www.crystal-fibre.com/products/air-guide.shtm).

On the other hand, the possibility of using either one of a holey fiber and a photonic crystal fiber (PCF), which are microstructure optical fibers (MOF) not implementing the photonic bandgap technique, as a communication fiber is being extensively discussed because of the wideband transmission potential thereof. For example, K. Kurokawa, et al., "Penalty-Free Dispersion-Managed Soliton Transmission over 100 km Low Loss PCF", Proc. OFC PDP21 (2005) discloses transmission characteristics of a dispersion management soliton that is constructed by combining a PCF and a dispersion compensating fiber (DCF), and has a 100 km-long transmission path and a transmission rate of 10 Gb/s.

Meanwhile, the photonic bandgap fiber also has the potential to be used as a communication fiber because of low optical nonlinearity and potential of low transmission loss.

However, as disclosed in the first literature, the operation wavelength of an optical signal that the photonic bandgap fiber uses for communication has such wavelength dispersion and a dispersion slope that a D/S ratio obtained by dividing the wavelength dispersion by the dispersion slope is extremely small. Thus, when an optical transmission path is constructed by using the photonic bandgap fiber, the wavelength dispersion and the dispersion slope cannot be compensated even by using a dispersion compensator of the conventional dispersion compensating fiber. As a result, it is not possible to perform long-haul wideband transmission of an optical signal.

SUMMARY OF THE INVENTION

It is an object of the present invention to at least partially solve the problems in the conventional technology.

According to an aspect of the present invention, there is provided an optical communication system employing an optical fiber as an optical transmission path. The optical transmission path includes a photonic bandgap fiber that includes a core formed by a hole at a center of the photonic bandgap fiber, an outer cladding formed around the core, and an inner cladding formed between the core and the outer cladding, in which a 2D Bragg grating is formed by periodically arranging a medium having a refractive index different from a refractive index of the outer cladding, and transmits a light of a predetermined operation wavelength within a photonic bandgap formed by the 2D Bragg grating; and an optical fiber that is connected to the photonic bandgap fiber, and has wavelength dispersion equal to or larger than 0 ps/nm/km and smaller than wavelength dispersion of the photonic bandgap fiber and D/S value, which is obtained by dividing the wavelength dispersion by dispersion slope, larger than D/S value of the photonic bandgap fiber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments for an optical communication system according to the present invention will be described below in detail with reference to the accompanying drawings. The present invention is not limited to the embodiments described below. Hereinafter, a photonic bandgap fiber is referred to as a PBGF, while a dispersion compensating fiber is referred to as a DCF. A cutoff wavelength ($\lambda_c$) mentioned below is the fiber cutoff wavelength defined in ITU-T (International Telecommunication Union Telecommunication Standardization Sector) G.650.1. Similarly, all other terms mentioned below but not particularly defined follow ITU-T G.650.1.

Figure 1:
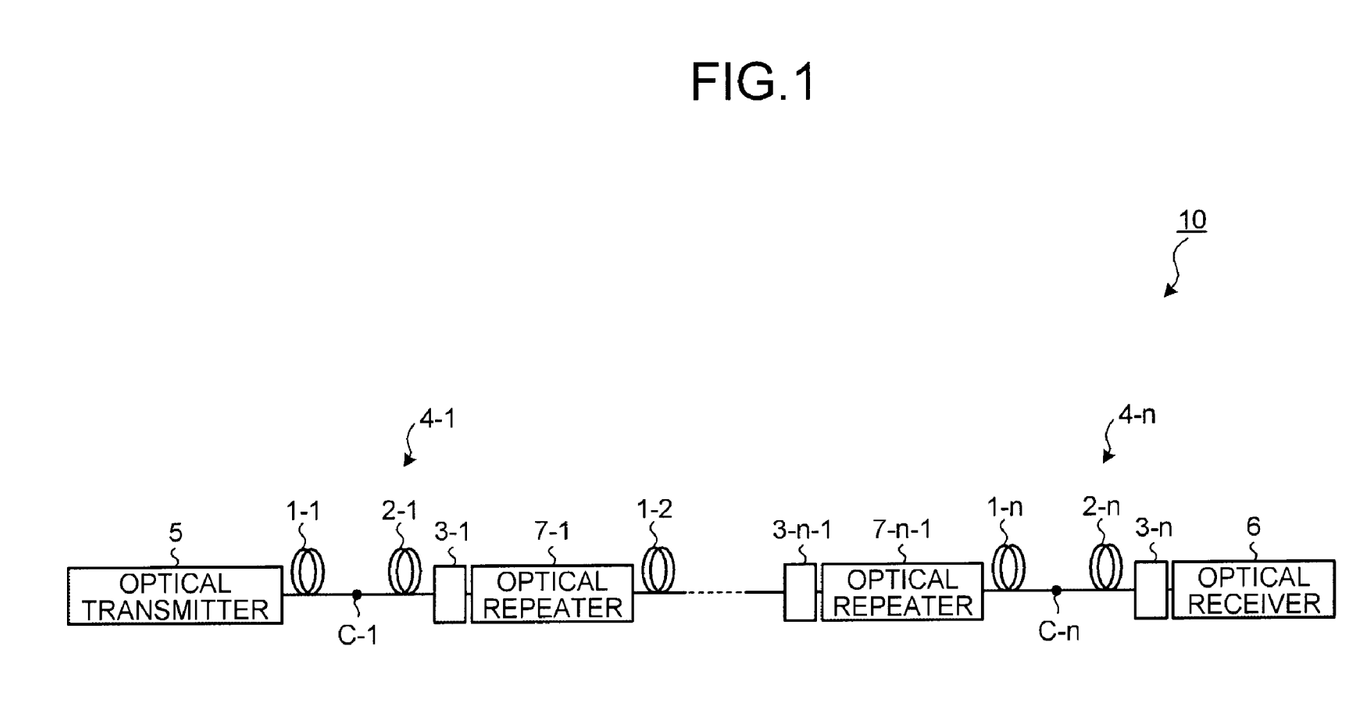
FIG. 1 is a block diagram of an optical communication system according to an embodiment of the present invention.

FIG. 1 is a block diagram of an optical communication system according to an embodiment of the present invention. As shown in FIG. 1, an optical communication system 10 according to the embodiment includes an optical transmitter 5 that transmits an optical signal, optical repeaters 7-1 to 7-n-1 that regeneratively repeat the optical signal transmitted by the optical transmitter 5, an optical receiver 6 that receives the optical signal, optical transmission paths 4-1 to 4-n that connect the optical transmitter 5, the optical repeaters 7-1 to 7-n-1, and the optical receiver 6 for the transmission of the optical signal. Meanwhile, 'n' is an integer equal to or larger than 2.

The optical transmission paths 4-1 to 4-n include PBGFs 1-1 to 1-n, optical fibers 2-1 to 2-n that are connected to the PBGFs 1-1 to 1-n by connection points C-1 to C-n, and dispersion compensators 3-1 to 3-n that are arranged adjacent to and are connected to the optical fibers 2-1 to 2-n. The parts of the optical communication system other than the PBGFs 1-1 to 1-n, the optical fibers 2-1 to 2-n, and the dispersion compensators 3-1 to 3-n in the optical transmission paths 4-1 to 4-n are made of a standard single-mode optical fiber and the like.

Figure 2:
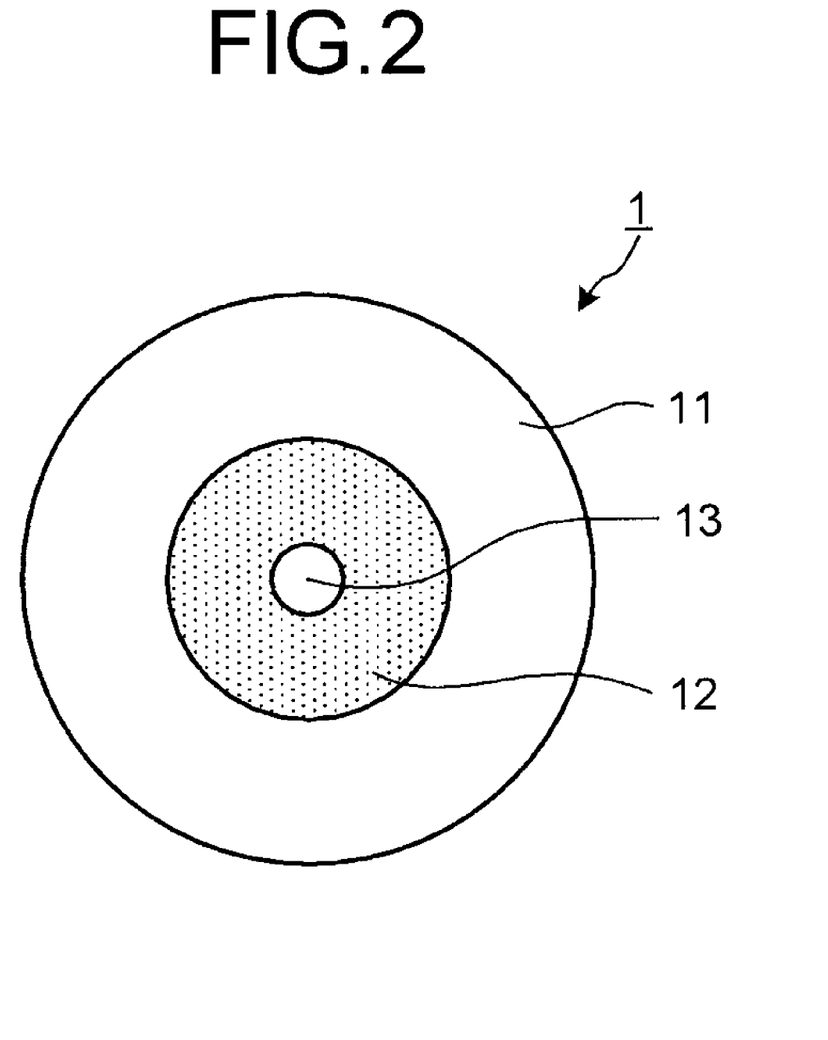
FIG. 2 is a schematic cross-sectional diagram of a PBGF according to the embodiment of the present invention.

FIG. 2 is a schematic cross-sectional diagram of a PBGF 1 according to the embodiment. Each of the PBGFs 1-1 to 1-n has an identical configuration to that of the PBGF 1, which in turn is identical to that disclosed in the first literature. The PBGF 1 includes an outer cladding region 11, an inner cladding region 12 in which a 2D Bragg grating is fabricated by periodically arranging minute holes that have a different refractive index than that of the outer cladding region 11, and a core region 13 formed by a hole near the center portion of the PBGF 1. The PBGF 1 transmits a light of an operation wavelength from a photonic bandgap formed by the 2D Bragg grating. The operation wavelength is, e.g., a center wavelength of 1550 nm of the photonic bandgap. At the center wavelength of 1550 nm, the PBGF 1 has large wavelength dispersion equal to or larger than 50 ps/nm/km and a large dispersion slope equal to or larger than 0.5 ps/nm²/km.

Moreover, at the center wavelength of 1550 nm, the optical fibers 2-1 to 2-n have wavelength dispersion equal to or larger than 0 ps/nm/km but smaller than wavelength dispersion of the PBGFs 1-1 to 1-n and a D/S ratio, which is obtained by dividing the wavelength dispersion by a dispersion slope, larger than D/S ratios of the PBGFs 1-1 to 1-n. Consequently, as compared to a case when an optical transmission path having length equal to that of the optical transmission paths 4-1 to 4-n is constructed by using only a PBGF, the sum of wavelength dispersion in the optical transmission paths 4-1 to 4-n decreases by a large margin and the D/S ratio thereof increases by a large margin.

Figure 3:
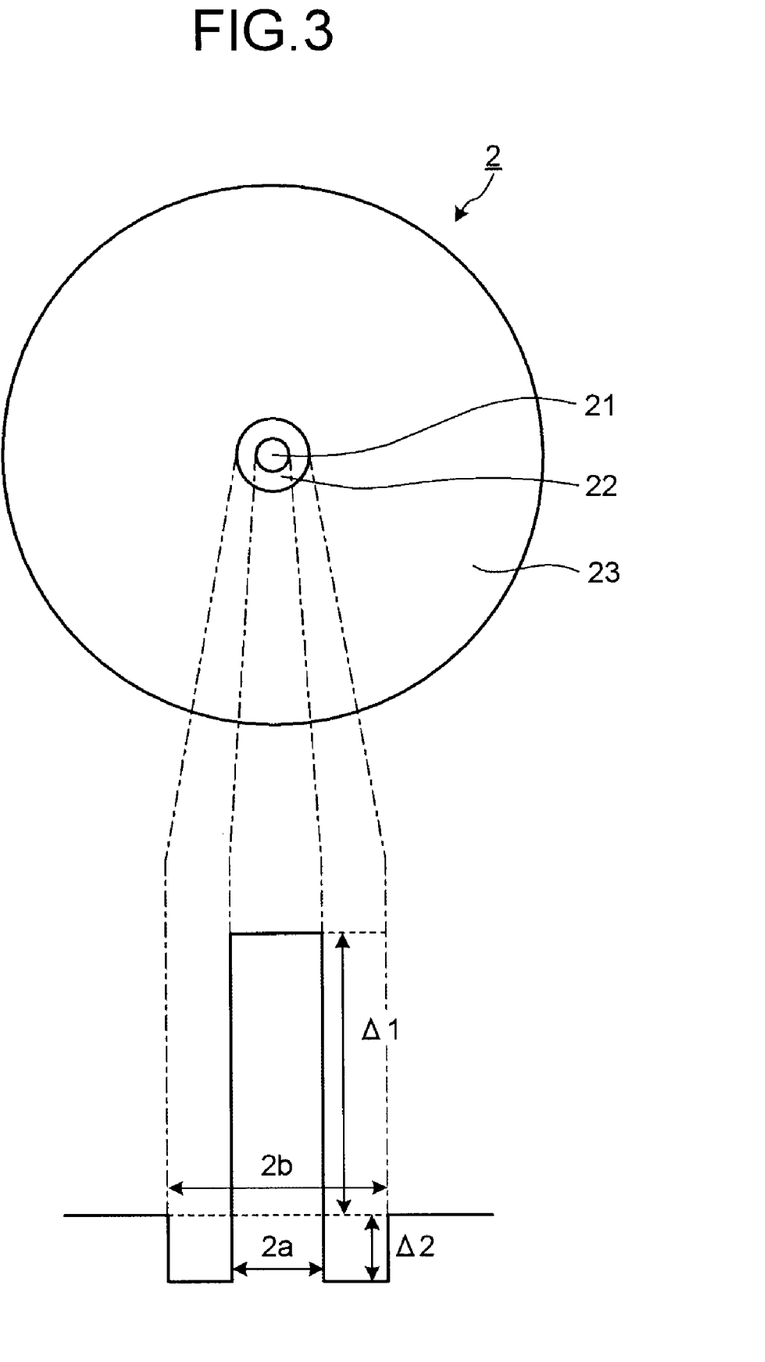
FIG. 3 is a schematic cross-sectional diagram of an optical fiber according to the embodiment of the present invention.

Given below is the detailed description of the optical fibers 2-1 to 2-n. FIG. 3 is a schematic cross-sectional diagram of an optical fiber 2 according to the embodiment of the present invention. Each of the optical fibers 2-1 to 2-n has an identical configuration to that of the optical fiber 2. The optical fiber 2 includes a center core region 21, an outer core layer 22 that is formed around the circumference of the center core region 21 and has a refractive index smaller than that of the center core region 21, and a cladding layer 23 that is formed around the circumference of the outer core layer 22 and has a refractive index smaller than that of the center core region 21 but larger than that of the outer core layer 22.

Regarding a refractive index profile of the optical fiber 2, the center core region 21 has a relative refractive index difference $\Delta 1$ of 0.15% to 0.4% with respect to the cladding layer 23. The outer core layer 22 has a relative refractive index difference $\Delta 2$ of −0.35% to −0.05% with respect to the cladding layer 23. An external diameter 2b of the outer core layer 22 has a relative b/a of 1.5 to 6 with respect to a diameter 2a of the center core region 21. Thus, the wavelength dispersion of the optical fiber 2 becomes equal to or larger than 0 ps/nm/km and equal to or smaller than 25 ps/nm/km. The D/S ratio of the optical fiber 2 becomes equal to or larger than 100 nm, particularly equal to or larger than 300 nm. An effective core area of the optical fiber 2 becomes equal to or larger than 80 $\mu m^2$. As a result, the sum of wavelength dispersion in the optical transmission paths 4-1 to 4-n can be reduced such that the D/S ratio increases and the optical nonlinearity decreases. Moreover, the optical loss can easily be reduced to 0.25 dB/km.

Because $\Delta 1$ lies in the abovementioned range, the bending loss of the optical fiber 2 also decreases sufficiently, in addition to the fact that the effective core area increases as described above. Because $\Delta 2$ lies in the abovementioned range, the bending loss of the optical fiber 2 also decreases sufficiently, in addition to the fact that the wavelength dispersion and the dispersion slope are adjusted as described above. Because b/s lies in the abovementioned range, the increase in the manufacturing cost due to the addition of a refractive-index adjusting dopant such as Ge or F can be curbed and the bending loss can be sufficiently reduced.

Figure 4:
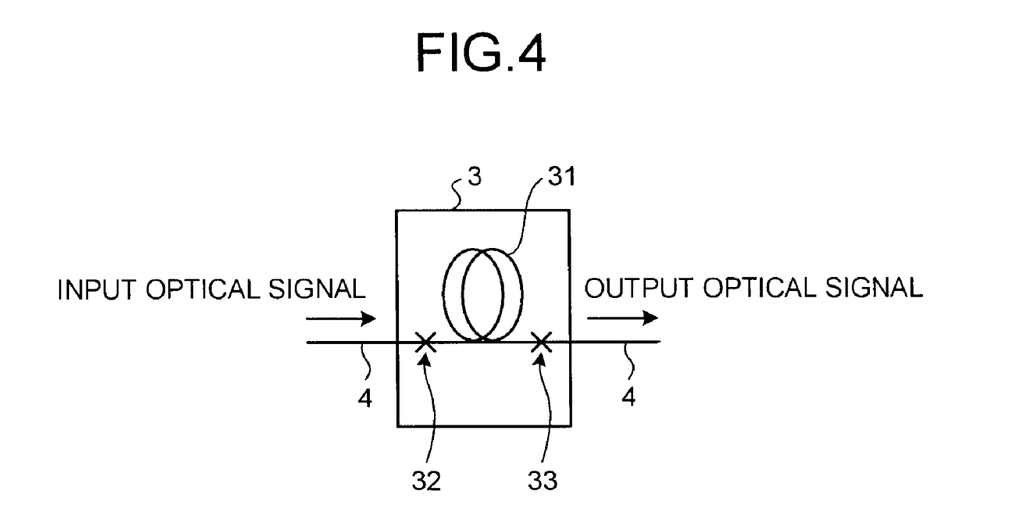
FIG. 4 is a schematic block diagram of a dispersion compensator according to the embodiment of the present invention.

FIG. 4 is a schematic block diagram of a dispersion compensator 3 according to the embodiment. Each of the dispersion compensators 3-1 to 3-n has an identical configuration to that of the dispersion compensator 3. The dispersion compensator 3 is a fiber-based dispersion compensator that is connected to a DCF 31 via connection points 32 and 33.

The dispersion compensator 3 according to the embodiment has negative wavelength dispersion that compensates the sum of wavelength dispersion of the PBGF 1 and the optical fiber 2, and a negative dispersion slope that compensates the average dispersion slope of the PBGF 1 and the optical fiber 2. As described above, as compared to a case when an optical transmission path is constructed by using only a PBGF, the sum of wavelength dispersion of the optical transmission paths of the PBGF 1 and the optical fiber 2 decreases by a large margin and the D/S ratio thereof increases by a large margin. Considering that, the dispersion compensator 3 having wavelength dispersion of about −80 ps/nm/km to −180 ps/nm/km and a D/S ratio of about 250 nm to 350 nm can be used to easily and sufficiently perform the dispersion compensation of, e.g., an optical transmission path constructed by using a conventional standard single-mode optical fiber (SMF). Thus, in the optical communication system 10, the wavelength dispersion and the dispersion slope can be compensated by using a conventional low-cost dispersion compensator while making use low optical nonlinearity and low transmission loss characteristic of the PBGFs 1-1 to 1-$n$. As a result, it becomes possible to perform long-haul wideband transmission of an optical signal.

In the optical transmission paths 4-1 to 4-$n$, the strength of an optical signal is maximum in an output unit of the optical transmitter 5 or the optical repeaters 7-1 to 7-$n$-1. Thus, to avoid nonlinear distortion in the optical signal, it is desirable to arrange the PBGFs 1-1 to 1-$n$ having low optical nonlinearity on the side of the output unit of the optical transmitter 5 or the optical repeaters 7-1 to 7-$n$-1.

Figure 5:
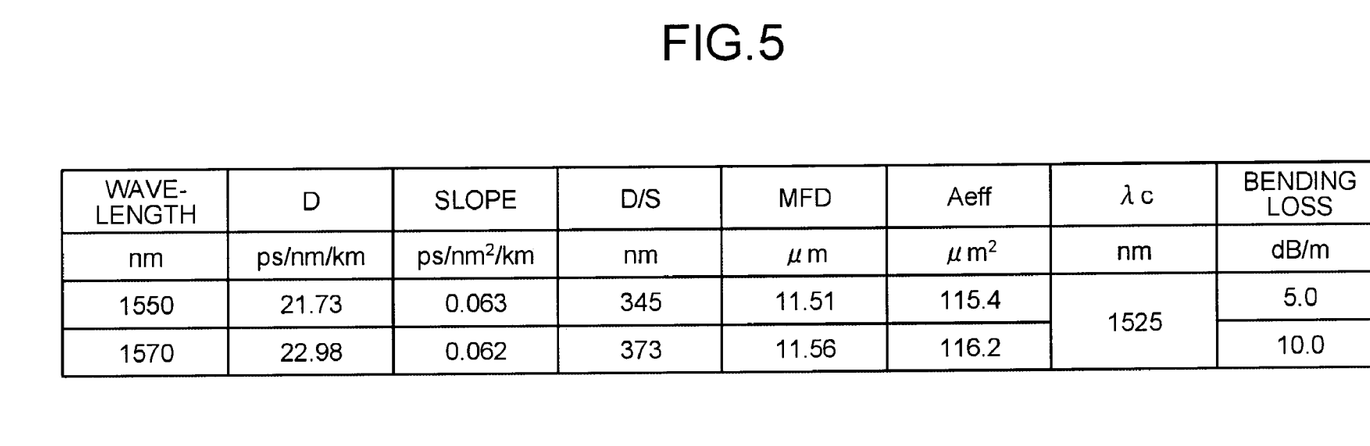
FIG. 5 is a table for explaining exemplary optical characteristics of the optical fiber shown in FIG. 3.
Figure 6:
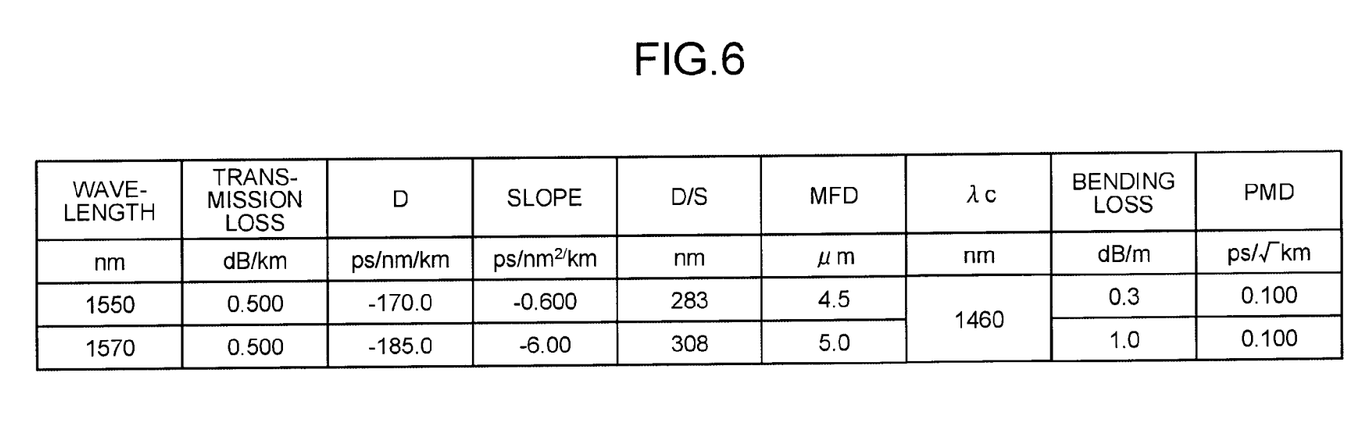
FIG. 6 is a table for explaining exemplary optical characteristics of a DCF shown in FIG. 4.

Given below is the description of the embodiment in more concrete terms by using a result of a simulated calculation. FIG. 5 is a table for explaining exemplary optical characteristics of the optical fiber 2 shown in FIG. 3. FIG. 6 is a table for explaining exemplary optical characteristics of the DCF 31 shown in FIG. 4. In FIG. 5, regarding the optical fiber 2, $\Delta 1$ is 0.3%, $\Delta 2$ is −0.2%, b/a is 4.0, and $2a$ is 13.5 µm. In FIGS. 5 and 6, "D" represents the wavelength dispersion, "Slope" represents the dispersion slope, "MFD" represents a mold field diameter, "Aeff" represents the effective core area, and "$\lambda_c$" represents the cutoff wavelength. Moreover, the bending loss is a value obtained when winding 16 turns at a diameter of 20 mm.

Figure 7:
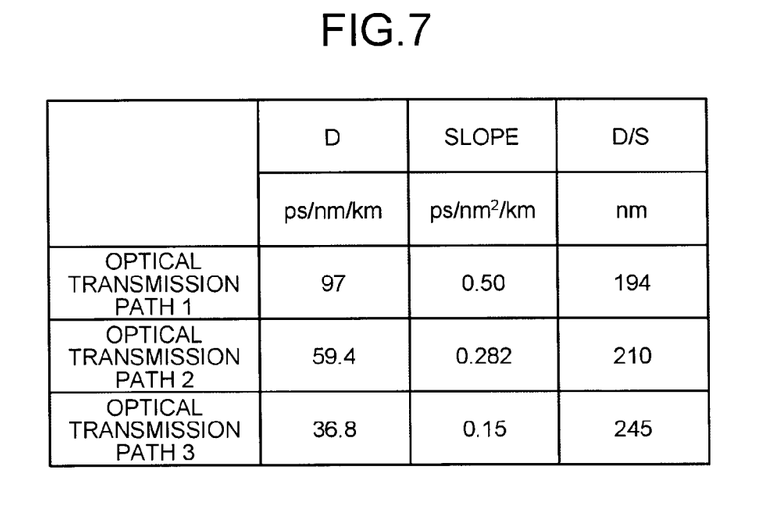
FIG. 7 is a table for explaining a sum of wavelength dispersion, an average dispersion slope, and an average D/S ratio at a wavelength of 1550 nm in an optical transmission path that is constructed by varying a ratio of lengths of the PBGF shown in FIG. 2 and the optical fiber shown in FIG. 3.

FIG. 7 is a table for explaining a sum of wavelength dispersion, an average dispersion slope, and an average D/S ratio at a wavelength of 1550 nm in an optical transmission path that is constructed by varying a ratio of lengths of the PBGF 1 shown in FIG. 2 and the optical fiber 2 shown in FIG. 3. In FIG. 7, the PBGF 1 has an identical configuration to that disclosed in the first literature. At a center wavelength of 1550 nm, the PBGF 1 has wavelength dispersion of 97 ps/nm/km and a dispersion slope of 0.5 ps/nm$^2$/km. Moreover, each of an "optical transmission path 1" to an "optical transmission path 3" is 100 km long. The "optical transmission path 1" is constructed by using only a 100 km-long PBGF 1. The "optical transmission path 2" is constructed by using a 50 km-long PBGF 1 and a 50 km-long optical fiber 2. The "optical transmission path 3" is constructed by using a 20 km-long PBGF 1 and an 80 km-long optical fiber 2. As shown in FIG. 7, in the case of the "optical transmission path 2" and the "optical transmission path 3" constructed by using the PBGF 1 and the optical fiber 2, the sum of wavelength dispersion and the average dispersion slope of decreases, while the average D/S ratio increases. Thus, it becomes easier to perform the dispersion compensation as compared to the "optical transmission path 1" constructed by using only the PBGF 1.

Figure 8:
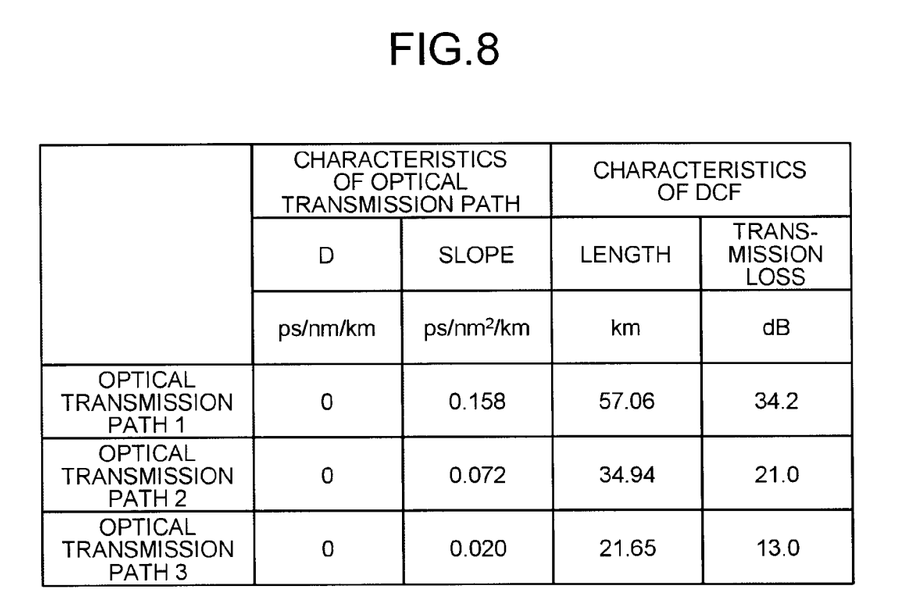
FIG. 8 is a table for explaining a sum of wavelength dispersion and an average dispersion slope at the wavelength of 1550 nm, and a DCF length and an optical loss when a dispersion compensator, which uses the DCF shown in FIG. 6, is connected to each optical transmission path shown in FIG. 7.

FIG. 8 is a table for explaining a sum of wavelength dispersion and an average dispersion slope at the wavelength of 1550 nm, and a DCF length and an optical loss when a dispersion compensator, which uses the DCF shown in FIG. 6, is connected to each optical transmission path shown in FIG. 7. The length of each DCF is adjusted such that the wavelength dispersion at the wavelength of 1550 nm in the corresponding optical transmission path becomes zero. As shown in FIG. 8, as compared to the "optical transmission path 1", the residual average dispersion slope decreases by a larger amount in the case of the "optical transmission path 2" and the "optical transmission path 3" constructed by using the PBGF 1 and the optical fiber 2. That makes the "optical transmission path 2" and the "optical transmission path 3" suitable for wideband transmission of an optical signal. Moreover, as compared to the "optical transmission path 1", the necessary length of the DCF decreases by a larger amount and the optical loss is equal to or smaller than 22 dB in the case of the "optical transmission path 2" and the "optical transmission path 3". As a result, the optical loss can be easily compensated by using, e.g., an erbium-doped optical amplifier (EDFA).

Figure 9:
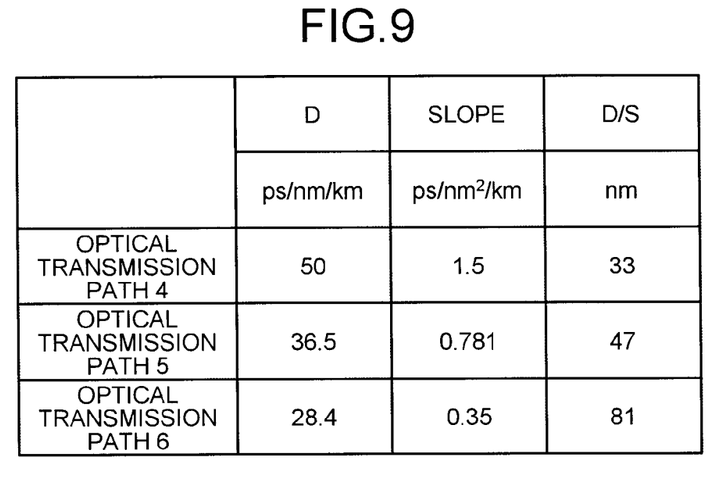
FIG. 9 is a table for explaining a sum of wavelength dispersion, an average dispersion slope, and an average D/S ratio at a wavelength of 1570 nm in an optical transmission path that is constructed by varying a ratio of lengths of the PBGF shown in FIG. 2 and the optical fiber shown in FIG. 3.

FIG. 9 is a table for explaining a sum of wavelength dispersion, an average dispersion slope, and an average D/S ratio at a wavelength of 1570 nm in an optical transmission path that is constructed by varying a ratio of lengths of the PBGF 1 shown in FIG. 2 and the optical fiber 2 shown in FIG. 3. In FIG. 9, the PBGF 1 has an identical configuration to that disclosed in the first literature. At a center wavelength of 1570 nm, the PBGF 1 has wavelength dispersion equal to 50 ps/nm/km and a dispersion slope equal to 1.5 ps/nm$^2$/km. Moreover, each of an "optical transmission path 4" to an "optical transmission path 6" is 100 km long. The "optical transmission path 4" is constructed by using only a 100 km-long PBGF 1. The "optical transmission path 5" is constructed by using a 50 km-long PBGF 1 and a 50 km-long optical fiber 2. The "optical transmission path 6" is constructed by using a 20 km-long PBGF 1 and an 80 km-long optical fiber 2. As shown in FIG. 9, in the case of the "optical transmission path 5" and the "optical transmission path 6" constructed by using the PBGF 1 and the optical fiber 2, the sum of wavelength dispersion and the average dispersion slope decreases, while the average D/S ratio increases. Thus, it becomes easier to perform the dispersion compensation as compared to the "optical transmission path 4" constructed by using only the PBGF 1.

Figure 10:
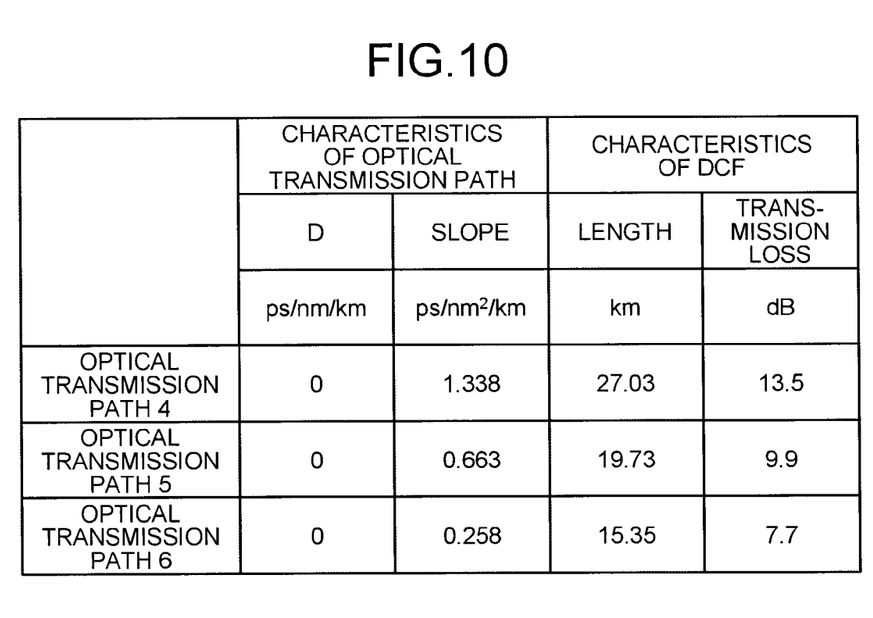
FIG. 10 is a table for explaining a sum of wavelength dispersion and an average dispersion slope at the wavelength of 1570 nm, and a DCF length and an optical loss when a dispersion compensator, which uses the DCF shown in FIG. 6, is connected to each optical transmission path shown in FIG. 9.

FIG. 10 is a table for explaining a sum of wavelength dispersion and an average dispersion slope at the wavelength of 1570 nm, and a DCF length and an optical loss when a dispersion compensator, which uses the DCF shown in FIG. 6, is connected to each optical transmission path shown in FIG. 9. The length of each DCF is adjusted such that the wavelength dispersion at the wavelength of 1570 nm in the corresponding optical transmission path becomes zero. As shown in FIG. 10, as compared to the "optical transmission path 4", the residual average dispersion slope decreases by a larger amount in the case of the "optical transmission path 5" and the "optical transmission path 6" constructed by using the PBGF 1 and the optical fiber 2. That makes the "optical transmission path 5" and the "optical transmission path 6" suitable for wideband transmission of an optical signal. Moreover, as compared to the "optical transmission path 4", the necessary length of the DCF and the optical loss decreases in the case of the "optical transmission path 5" and the "optical transmission path 6". As a result, the optical loss can be easily compensated by using an optical amplifier.

If a so-called high FOM (Figure of Merit) type DCF having a large dispersion compensation capacity with respect to the optical loss, for example, a ratio of absolute value of dispersion to optical loss per unit length equal to or larger than 350 ps/nm/dB, is used, it is possible to further reduce the DCF length as well as the optical loss.

Figure 11:
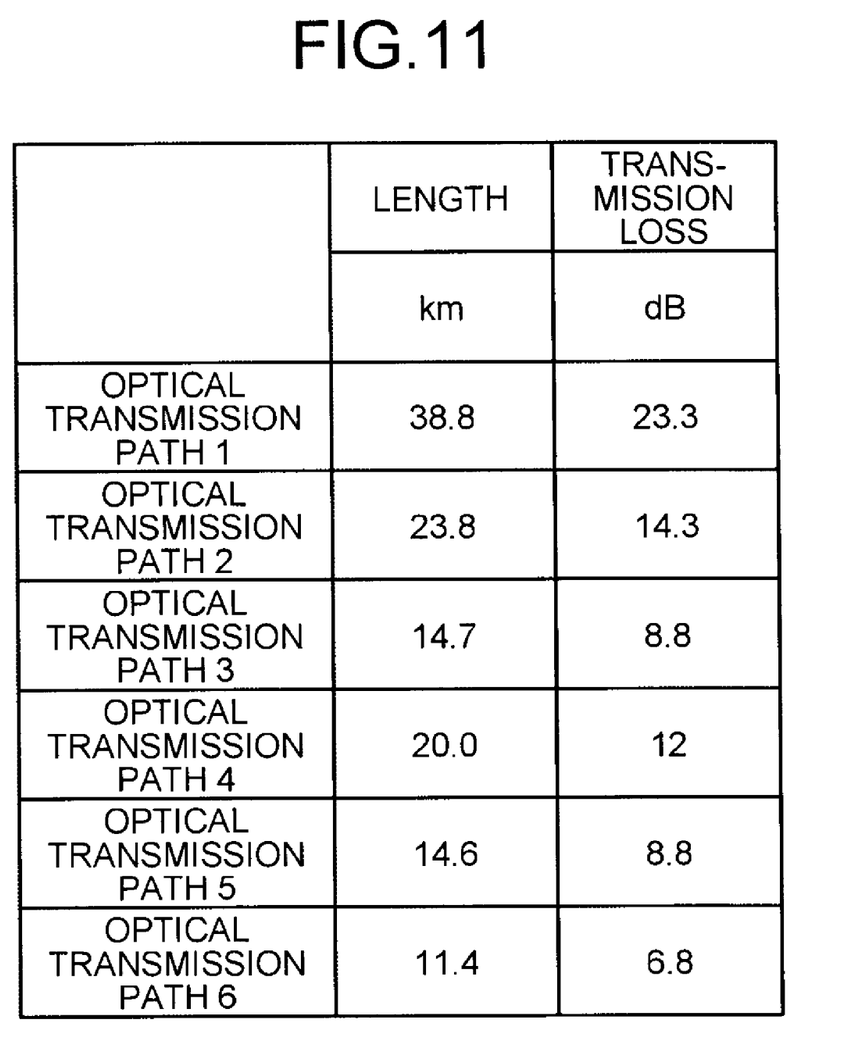
FIG. 11 is a table for explaining a DCF length and an optical loss when a dispersion compensator that uses a high FOM DCF is connected to each optical transmission path shown in FIGS. 7 and 9 such that wavelength dispersion at the wavelength of 1550 nm or at the wavelength of 1570 nm becomes zero.

FIG. 11 is a table for explaining a DCF length and an optical loss when a dispersion compensator that uses a high FOM DCF is connected to each optical transmission path shown in FIGS. 7 and 9 such that the wavelength dispersion at the wavelength of 1550 nm or at the wavelength of 1570 nm becomes zero. The wavelength dispersion of the high FOM DCF is 250 ps/nm/km and the optical loss thereof is 0.6 dB/km at each of the wavelength of 1550 nm and the wavelength of 1570 nm.

As shown in FIG. 11, when the high FOM DCF is used, the DCF length and the optical loss can be reduced by larger amounts as compared to the results shown in FIGS. 8 and 10. For example, in the case of the "optical transmission path 1", the DCF length is 57.06 km and the optical loss is 34.2 dB in FIG. 8. However, the DCF length is reduced to 38.8 km and the optical loss is reduced to 23.3 dB in FIG. 11. Thus, the optical loss can be reduced by larger than 10 dB. Moreover, in the case of the "optical transmission path 4", the DCF length is 27.03 km and the optical loss is 13.5 dB in FIG. 10. However, the DCF length is reduced to 20.0 km and the optical loss is reduced to 12 dB in FIG. 11. Thus, the optical loss can be reduced by about 1.5 dB.

The optical fiber 2 has the refractive index profile shown in FIG. 3. To achieve the abovementioned refractive index profile, the optical fiber 2 can be made of a silica-based optical fiber. Moreover, a predetermined amount of Ge can be added to the center core region 21, a predetermined amount of F can be added to the outer core layer 22, while the cladding layer 23 can be made of pure silica without adding thereto a refractive-index adjusting dopant. Another way of achieving the abovementioned refractive index profile is to make the center core region 21 of pure silica, and to add a predetermined amount of F to each of the outer core layer 22 and the cladding layer 23. If the center core region 21 is made of pure silica, the optical loss of the optical fiber 2 can be reduced to about 0.17 dB/km. Moreover, because Ge is not added to the center core region 21, it becomes possible to further reduce the optical nonlinearity.

To use an optical fiber for a WDM transmission and the like, it is important to determine a wavelength compensation rate based on how large a bandwidth can a DCF compensate. The wavelength compensation rate is obtained by Equation (1).

$$\text{wavelength compensation rate} = (\text{average D/S of optical transmission path})/(\text{D/S of DCF}) \times 100 \quad (1)$$

It is desirable to use the DCF 31 having a wavelength compensation rate of 70% to 130% to enable compensation of the wavelength dispersion over a large bandwidth.

As shown in FIG. 6, at the wavelength of 1550 nm, the D/S ratio of the DCF 31 is 283 nm. In that case, although the wavelength compensation rate in the "optical transmission path 1" is about 68%, the wavelength compensation rate in the "optical transmission path 2" improves to about 74%, while the wavelength compensation rate in the "optical transmission path 3" improves to about 86%.

Meanwhile, the use of the DCF 31 is not limited to an optical transmission path using an SMF. For example, when a nonzero dispersion-shifted fiber (NZ-DSF) is used as an optical transmission path, the D/S ratio is smaller and equal to, e.g., 100 nm. In that case, the wavelength compensation rate in the "optical transmission path 6" can improve to 81%. Thus, a suitable type of the DCF 31 can be selected depending on the average D/S ratio of the PBGF 1 and the optical fiber 2.

In the above embodiment, the center wavelength of the PBGF 1 is described to be 1550 nm within a C-band (1530 nm to 1565 nm) and 1570 nm within an L-band (1565 nm to 1625 nm). However, a PBGF can be suitably selected such that a center wavelength thereof is within 800 nm to 1700 nm, which is the bandwidth to achieve low optical loss in a silica glass optical fiber.

Figure 12:
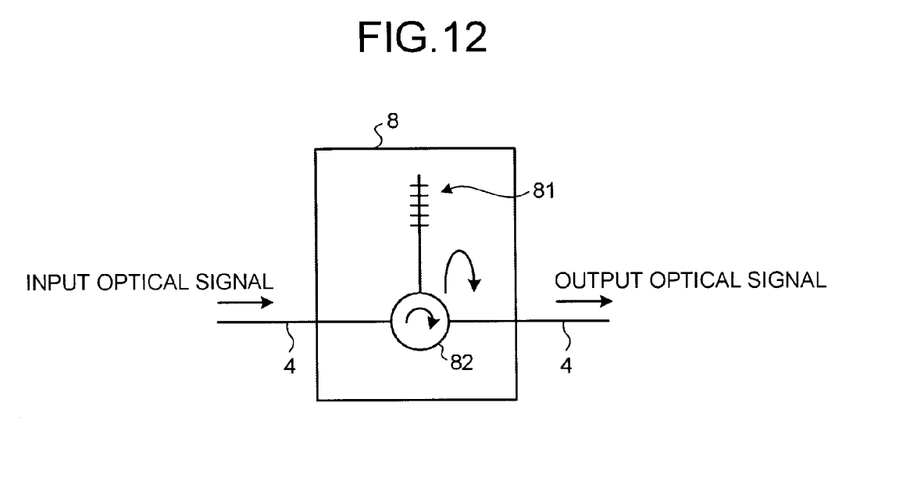
FIG. 12 is a schematic block diagram of a fiber 2D Bragg grating dispersion compensator according to a modification of the embodiment of the present invention.

In the optical communication system according to the embodiment, a fiber-based dispersion compensator is used. However, as a modification of the embodiment, it is also possible to use a fiber 2D Bragg grating dispersion compensator. FIG. 12 is a schematic block diagram of a fiber 2D Bragg grating dispersion compensator according to a modification of the embodiment. A fiber 2D Bragg grating dispersion compensator 8 includes a dispersion compensation fiber 2D Bragg grating 81 and an optical circulator 82. Input ports of the optical circulator 82 are connected to an optical transmission path 4, 4 and the dispersion compensation fiber 2D Bragg grating 81. An optical signal having a distorted waveform due to waveform dispersion enters the optical circulator 82 from the left side of the optical transmission path 4 in FIG. 12. The optical circulator 82 outputs the optical signal to the dispersion compensation fiber 2D Bragg grating 81. The dispersion compensation fiber 2D Bragg grating 81 performs distributive reflection of the received optical signal by using a grating fabricated in a core region, fixes the wavelength distortion of the optical signal, and outputs the optical signal to the optical circulator 82. The optical circulator 82 then outputs the optical signal without wavelength distortion in the optical transmission path 4 from the right side in FIG. 12. In this way, the fiber 2D Bragg grating dispersion compensator 8 can compensate the wavelength dispersion at an operation wavelength in the optical transmission path 4.

As described above, according to an aspect of the present invention, it is possible to easily compensate wavelength dispersion characteristics of an optical transmission path while making use of low optical nonlinearity and low transmission loss characteristics of a photonic bandgap fiber.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical communication system employing an optical fiber as an optical transmission path, wherein the optical transmission path includes
    a photonic bandgap fiber that includes
        a core formed by a hole at a center of the photonic bandgap fiber,
        an outer cladding formed around the core, and
        an inner cladding formed between the core and the outer cladding, in which a two-dimensional Bragg grating is formed by periodically arranging a medium having a refractive index different from a refractive index of the outer cladding, and transmits a light of a predetermined operation wavelength within a photonic bandgap formed by the two-dimensional Bragg grating; and
    an optical fiber that is connected to the photonic bandgap fiber, and has wavelength dispersion equal to or larger than 0 ps/nm/km and smaller than wavelength dispersion of the photonic bandgap fiber and D/S value, which is obtained by dividing the wavelength dispersion by dispersion slope, larger than D/S value of the photonic bandgap fiber.

2. The optical communication system according to claim 1, wherein the optical fiber has the wavelength dispersion equal to or smaller than 25 ps/nm/km and the D/S value equal to or larger than 100 nanometers.

3. The optical communication system according to claim 1, wherein the optical transmission path further includes a dispersion compensator that is connected to either one of the photonic bandgap fiber and the optical fiber, and has negative wavelength dispersion and negative dispersion slope for compensating a sum of wavelength dispersions and an average dispersion slope of the photonic bandgap fiber and the optical fiber at the operation wavelength.

4. The optical communication system according to claim 3, wherein the dispersion compensator has D/S value of 70% to 130% of average D/S value of the photonic bandgap fiber and the optical fiber.

5. The optical communication system according to claim 3, wherein the dispersion compensator has wavelength dispersion equal to or smaller than −80 ps/nm/km at the operation wavelength.

6. The optical communication system according to claim 1, wherein the operation wavelength is 800 nanometers to 1700 nanometers.

7. The optical communication system according to claim 6, wherein the operation wavelength is 1530 nanometers to 1625 nanometers.

8. The optical communication system according to claim 6, further comprising a dispersion compensator having wavelength dispersion equal to or smaller than −80 ps/nm/km at the operation wavelength.

9. The optical communication system according to claim 1, wherein
the optical fiber includes
a center core region,
an outer core layer that is formed on an outer circumference of the center core region and has a refractive index lower than a refractive index of the center core region, and
a cladding layer that is formed on an outer circumference of the outer core layer and has a refractive index lower than the refractive index of the center core region and larger than the refractive index of the outer core layer, and
at a wavelength of 1550 nanometers, wavelength dispersion is equal to or smaller than 25 ps/nm/km, D/S value equal to or larger than 300 nanometers, effective core area equal to or larger than 80 μm², and optical loss equal to or smaller than 0.25 dB/km.

10. The optical communication system according to claim 9, further comprising a dispersion compensator having wavelength dispersion equal to or smaller than −80 ps/nm/km at the operation wavelength.

11. The optical communication system according to claim 1, wherein
the optical fiber includes
a center core region,
an outer core layer that is formed on an outer circumference of the center core region and has a refractive index lower than a refractive index of the center core region, and
a cladding layer that is formed on an outer circumference of the outer core layer and has a refractive index lower than the refractive index of the center core region and larger than the refractive index of the outer core layer, and
a relative refractive index difference between the center core region and the cladding layer is 0.15% to 0.4%,
a relative refractive index difference between the outer core layer and the cladding layer is −0.35% to −0.05%, and
a ratio of outer diameter of the outer core layer to diameter of the center core region of 1.5 to 6.

12. The optical communication system according to claim 11, further comprising a dispersion compensator having wavelength dispersion equal to or smaller than −80 ps/nm/km at the operation wavelength.

13. The optical communication system of claim 1, wherein the photonic bandgap fiber and the optical fiber each have a wavelength dispersion value of a same sign.

14. The optical communications system of claim 13, wherein the photonic bandgap fiber and the optical fiber each have a positive wavelength dispersion.

15. The optical communication system of claim 14, wherein a ratio of a length of the photonic bandgap fiber to the optical fiber is 1 or less.

16. The optical communication system of claim 15, wherein a ratio of a length of the photonic bandgap fiber to the optical fiber is ¼ or less.

17. The optical communication system of claim 1, wherein a ratio of a length of the photonic bandgap fiber to the optical fiber is 1 or less.

18. The optical communication system of claim 17, wherein a ratio of a length of the photonic bandgap fiber to the optical fiber is ¼ or less.

* * * * *